Dec. 23, 1958     F. R. GONSETT     2,865,799
MACHINE FOR THE MANUFACTURE OF MULTIPLE STRAND
ELECTRICAL CONDUCTOR LEADS
Original Filed Sept. 4, 1951     5 Sheets—Sheet 1

INVENTOR
FAUST R. GONSETT

BY *Franklin S. Long.*
ATTORNEY

Dec. 23, 1958     F. R. GONSETT     2,865,799
MACHINE FOR THE MANUFACTURE OF MULTIPLE STRAND
ELECTRICAL CONDUCTOR LEADS
Original Filed Sept. 4, 1951     5 Sheets-Sheet 2
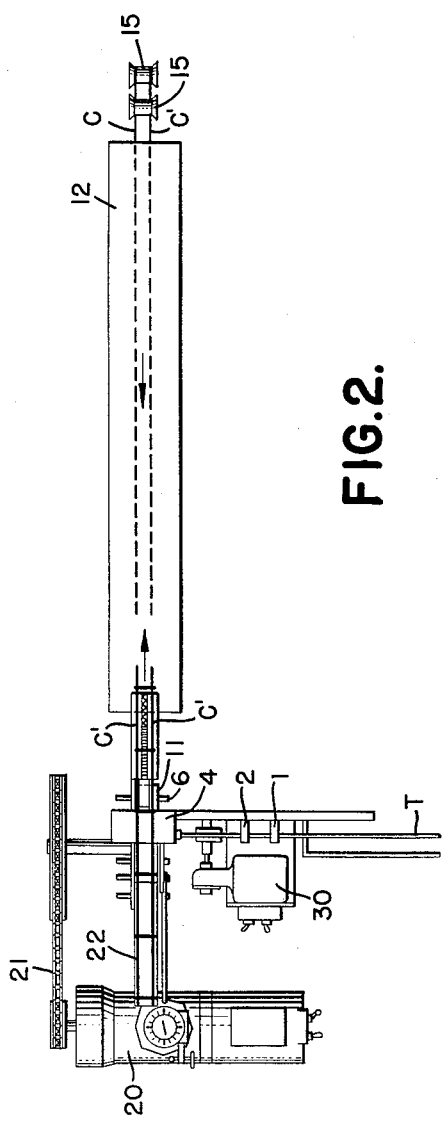
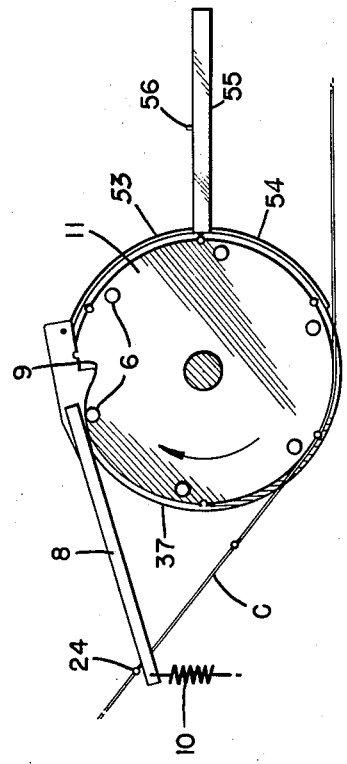
INVENTOR
FAUST R. GONSETT
BY *Franklin S. Long*
ATTORNEY Dec. 23, 1958  F. R. GONSETT  2,865,799
MACHINE FOR THE MANUFACTURE OF MULTIPLE STRAND
ELECTRICAL CONDUCTOR LEADS
Original Filed Sept. 4, 1951  5 Sheets-Sheet 3

INVENTOR
FAUST R. GONSETT

BY Franklin S. Long
ATTORNEY

Dec. 23, 1958  F. R. GONSETT  2,865,799
MACHINE FOR THE MANUFACTURE OF MULTIPLE STRAND
ELECTRICAL CONDUCTOR LEADS
Original Filed Sept. 4, 1951  5 Sheets-Sheet 4

INVENTOR
FAUST R. GONSETT

BY Franklin S. Long
ATTORNEY

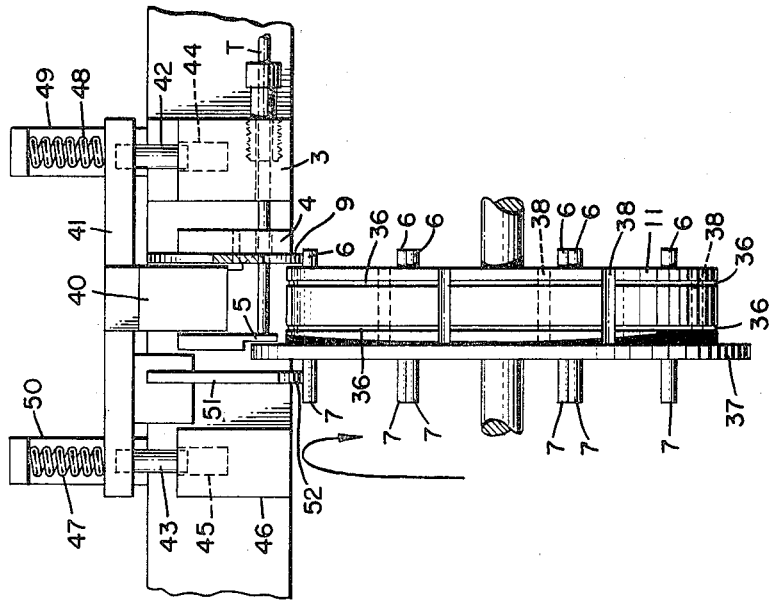
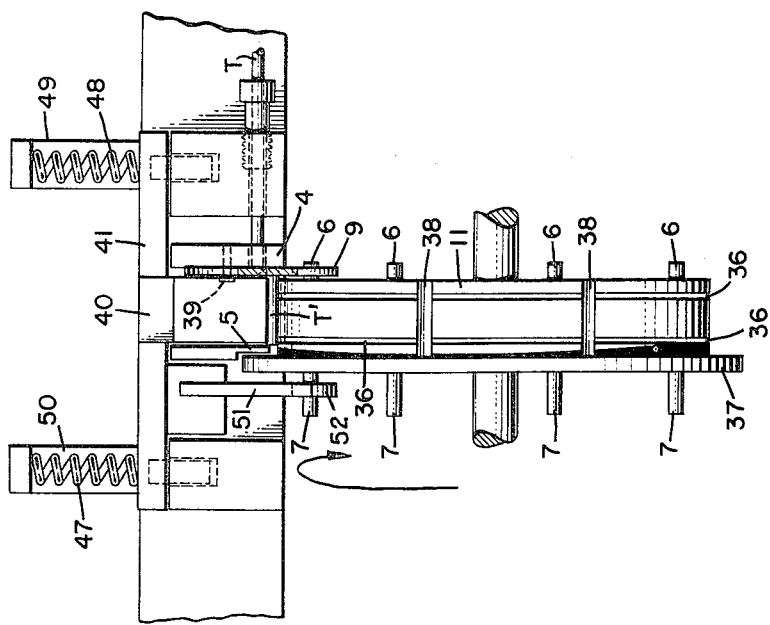

United States Patent Office 2,865,799
Patented Dec. 23, 1958

2,865,799

MACHINE FOR THE MANUFACTURE OF MULTIPLE STRAND ELECTRICAL CONDUCTOR LEADS

Faust R. Gonsett, Burbank, Calif., assignor, by mesne assignments, to L. A. Young Spring & Wire Corporation, Detroit, Mich., a corporation of Michigan Substitute for abandoned application Serial No. 244,906, September 4, 1951. This application January 26, 1953, Serial No. 333,086

16 Claims. (Cl. 154—2.24)

This invention relates to a machine for the manufacture of multiple strand electrical conductor leads of the air insulated variety. The leads are for use primarily as conductor leads electrically uniting a television antenna and a television receiving set.

It is an object of this invention to provide a machine which will take a pair of bare conducting wires, preferably copper, from a spool or spools of wires, heat the wires simultaneously and maintain said wires under suitable tension while advancing and pressing the heated wires successively into a series of plastic spacing elements disposed in uniformly spaced relation and thereby unite the wires in spaced relation to each other by said elements.

It is an object of this invention to provide a finished product comprising a multiple wire conductor lead, said wires being united in uniformly spaced relation by pieces of thermoplastic material, preferably polystyrene, wherein the union of the plastic material pieces or elements are united by heated wires pressed to some extent into the end portions of the pieces while the wires are heated and maintained under tension resulting in pressure to cause the wires to sink sufficiently into the plastic pieces to make firmly united joints between the plastic elements or pieces and the wires.

Other objects and advantages will become apparent from the detailed description of the drawings which constitute a part of my application.

In the drawings:

Fig. 2 is a schematic plan view of the machine of Fig. 1.

Fig. 5 is a fragmentary elevation of the edge of the main pulley with the feed control means for the plastic elements in its lower position adjacent the main pulley.

Fig. 6 is a fragmentary elevation similar to Fig. 5 with the plastic element feet control means in its elevated position some distance from the main pulley.

Fig. 8 (Sheet 2) is a side elevational view of a fragment of the machine showing schematically the main pulley and some of the related parts.

Figure 1:
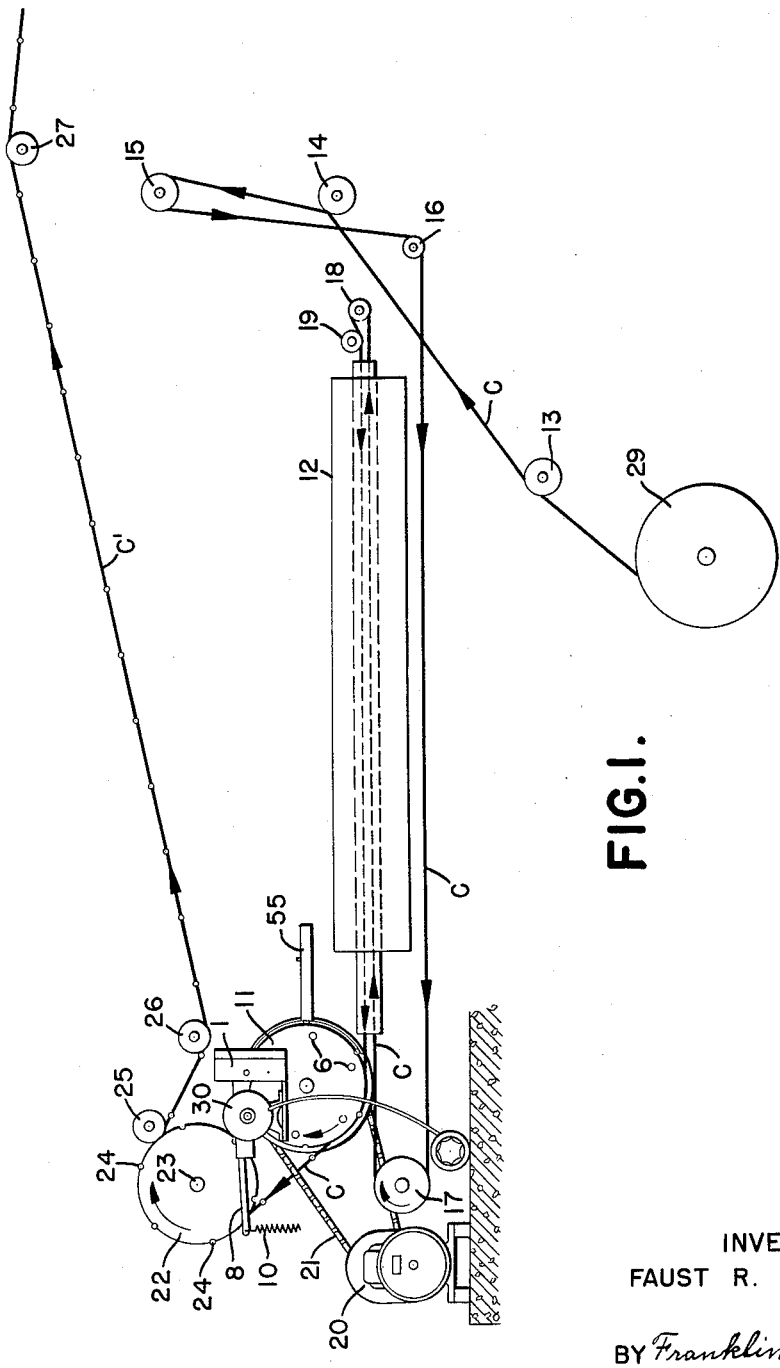
Fig. 1 is a schematic side elevation of the machine disclosing generally the mechanism for making spaced multiple conductor leads.
Figure 3:
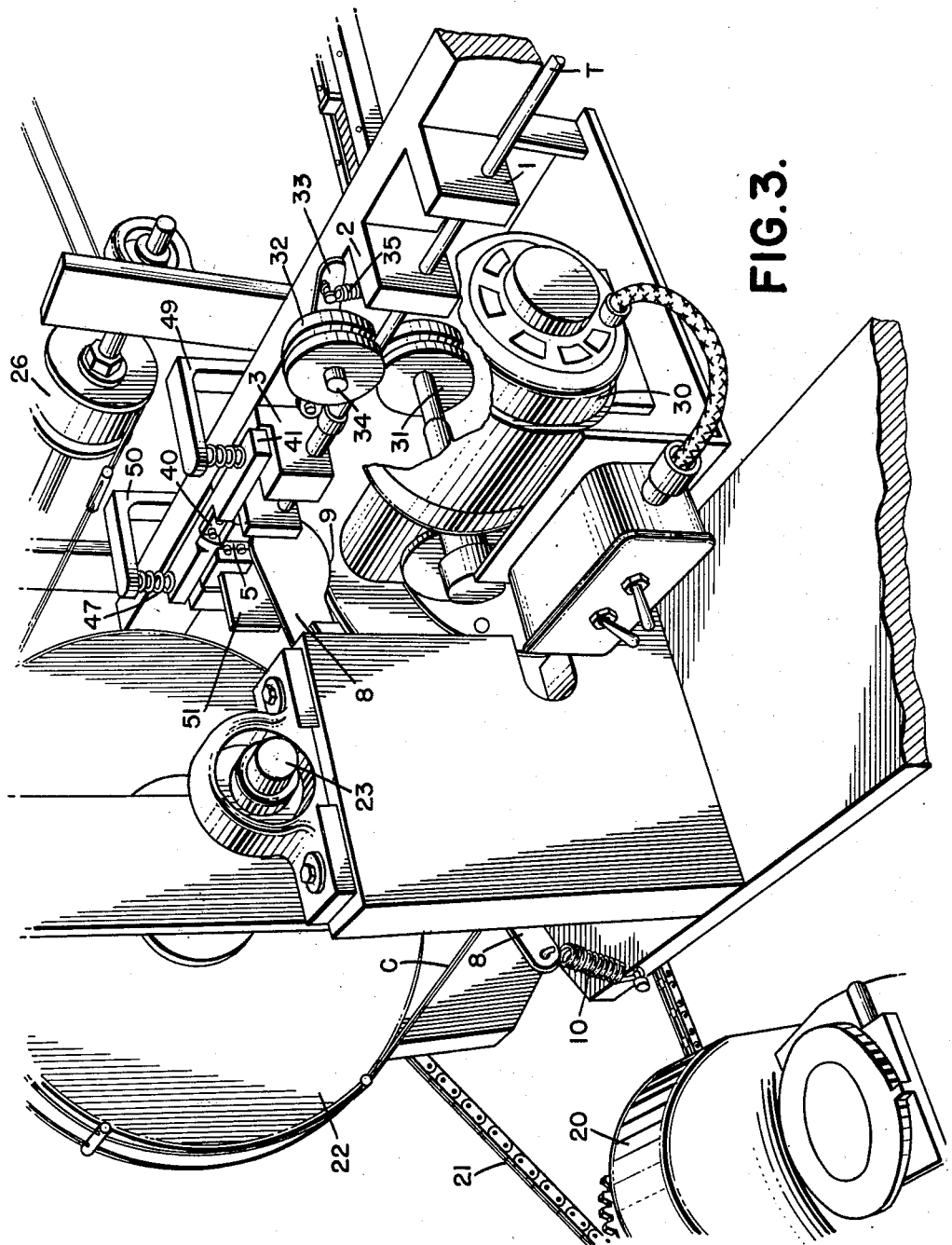
Fig. 3 is a fragmentary perspective view showing details of the means for feeding the plastic rod and the severing means for the rod and other essential construction.

In the machine of Figs. 1 and 2, the feeding means for the polystyrene rod works intermittently as shown. It will be seen that the polystyrene rod T is guided and fed between V type feed wheels or grooved rollers 31—32 provided respectively with frictional slipping contact with the rod as it continues through the supporting guides 1, 2, 3, 4, Fig. 3, 4, 7, and finally ending against the stop bar 5. The rod T is moved intermittently in cycles, timed with the actuating stud supported rollers 6 and 7 projecting laterally from the sides of the main wheel or pulley 11.

The combined guide and cutting block 4 and cutting blade 8 work like a cigar tip cutter, and normally the blade 8 is down, thus keeping the thermoplastic rod from going through and making physical contact with the stop 5. When an actuating stud or pin 6 comes into the proper position and hits the cam lobe 9 on the blade 8 it raises the blade 8 and thereby provides a path for the rod to shoot through and against the stop 5, and the blade 8 is propelled downwardly by the spring 10 to sever the plastic rod. After the pin 6 passes the peak of the cam lobe 9 on blade 8, the blade is released from its elevated position to be propelled downwardly by the spring 10 as clearly disclosed.

In the general scheme, Figs. 1 and 2, there is an oven 12, gas or electric, through which a pair of bare wires c, preferably copper, are drawn, being reeved about pulleys 13, 14, 15, 16, 17, then through the oven 12 and reeved about pulley 18 and back through the oven 12 to the main pulley 11. The pulley 19 is merely a tension pulley.

The main pulley 11 is driven by the principal motor 20 which is provided with speed regulating means in a conventional manner not shown. A chain drive 21, preferably, connects the main pulley with the principal motor. The main pulley is driven at a suitably reduced speed from that of the principal motor, as clearly shown. A second or additional pulley 22 is supported on a shaft 23 arranged on a higher level than the main pulley 11 and the shaft thereof. The additional pulley 22 receives the wires c, c which are reeved about the major portion of pulley 22. The wires c are now carrying the polystyrene spacing elements or pieces 24. The pulley 22 is a cooling means and is propelled, preferably, by a chain drive connecting both of the pulleys 11 and 22 so that they maintain the same peripheral speed. A pair of tension pulleys 25 and 26 assist in maintaining the now finished conductor lead on the cooling pulley 22. The pulley 26 and the pulley 27 guide the finished lead C' to the winding reel (not shown).

The reel or reels 29 comprise the supply of bare conducting wire which is conducted and guided through the oven. In order to maintain a suitable tension on the wires c, c from the supply reel or reels, they are provided with suitable brakes (not shown).

In order to feed the polystyrene T forwardly an auxiliary or additional motor 30 is provided to actuate the grooved roller 31. The opposed grooved idler roller 32 is mounted on a spring actuated pivoted lever 33, said arm having a stub shaft 34 carrying said idler roller. The tension spring 35 merely urges the roller 32 against the polystyrene rod T.

Further detailed description is to be noted in connection with Figs. 3 to 8 inclusive. The main pulley 11 is provided on its circumferential face with parallel or equally spaced grooves 36.

These grooves 36 receive the heated bare wires c, c. One face of pulley 11 is provided with a continuous circumferentially projecting flange 37 constituting a stop for one end of each piece of polystyrene. The circumferential face of pulley 11 is provided with equally spaced transverse receivers or grooves 38 which intersect the grooves 36 and extend to a greater depth into the pulley 11 than do the grooves 36, whereby the thermoplastic pieces in the grooves 38 are overlain transversely by the heated wires c, c under tension and pressure so as to cause them to locally fuse and sink into the thermoplastic pieces adjacent the ends of said pieces. After both the wire and plastic pieces are cooled, it is found that both the wires and plastic pieces are firmly and permanently united to constitute an air insulated multiple conductor lead, very suitably adapted to connect an outside television antenna to a television set within a sheltered construction.

The blade 8 is pivoted at 39 to the combined cutting block and guide 4. The blade 8 is angularly elevated intermittently by the pins 6 as they contact the cam lobe 9 on the blade 8. The polystyrene rod T is axially in alignment with a position above the major portion of the circumference of pulley 11 but it is not above the stop flange 37. When a piece of the polystyrene is severed, it drops into a recess or receiver 38 aided and guided by the upright intermittently movable aligner plate 40. The plate 40 is secured to a transverse bar 41. The bar 41 is provided with depending guide pins 42 and 43 guided in sockets 44 and 45 in the blocks or brackets 3 and 46. The bar 41 and aligner plate 40 are actuated in one direction by the compression springs 47 and 48 which as shown are aided by the force of gravity. The compression springs are suitably located and maintained in brackets 49 and 50. The bar 41 is also provided with a depending arm 51 terminating in a cam lobe 52 on its lower extremity located in the path of the suitably spaced pins 7 on pulley 11.

The stop 5 is stationary and is located in the path of the rod T. The function of the stop 5 is to gauge the length of the pieces severed from the rod T. When the blade 8 is down it serves intermittently as a stop for the rod T, and when it is raised sufficiently the rod T is moved along rapidly by the friction drive of the rollers 31 and 32 until the rod hits the stationary stop 5. Just after the severance of the rod, the aligner plate 40 descends sufficiently to aid in aligning the cut piece so as to drop into the adjacent transverse recess or receiver 38.

The pulley or wheel 11 may be designated as an indexing or spacing means, inasmuch as it carries the pieces of work in uniformly spaced relation.

The indexing means or mechanism comprises principally the main wheel or pulley 11 with its oppositely arranged recesses or receivers 38 which intersect the grooves 36. Of course, the feeding means for the polystyrene elements 24 may also be considered a part or parts of the indexing mechanism, inasmuch as, they are assembling means for the elements while the main wheel 11 controls the spacing of the plastic elements as they are being assembled.

The cut pieces of plastic T' are retained in the recesses 38 by curved leaf springs 53 and 54, as shown in Fig. 8. This retention is maintained until the pieces T' are engaged by the hot bare wires c, c.

In order to insure that a cut piece T' is in proper position in every passing recess 38, an auxiliary or safety supply magazine 55 is provided to automatically fill each empty passing recess, if any should occur for any reason whatsoever. The auxiliary magazine 55 is suitably secured to the frame of the machine with the feed exit located in the path of the recesses or receivers 38 and between the adjacent terminals of the springs 53 and 54.

Figure 4:
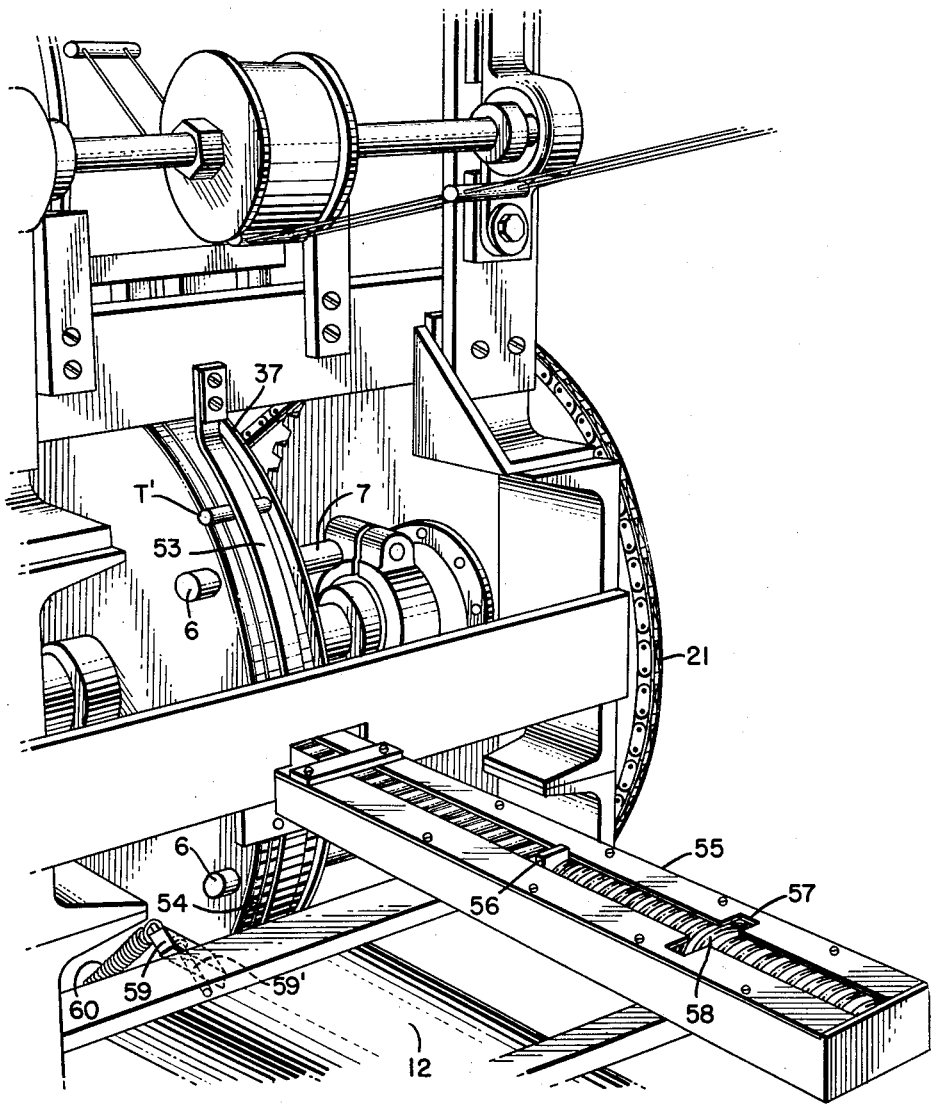
Fig. 4 is a fragmentary perspective view showing portions of the frame construction, the main wire and plastic receiving wheel or pulley, the safety auxiliary feeding magazine, as well as other essential construction.
Figure 7:
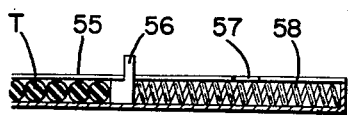
Fig. 7 (Sheet 4) is longitudinal section of a fragment of the auxiliary feed magazine.

The preferred construction of the magazine is disclosed in Figs. 4 and 7 in which the cut pieces of plastic are located in parallel relation between the feed exit and a spring pressed follower 56. In order to replenish the magazine, the follower 56 can be forced backwardly against the tension of the spring beyond the aligned transverse slots 57 and 58, so that suitable pieces could be dropped through the slots 57 and 58 into the magazine.

Inasmuch as the pieces or elements T' may not be aligned properly relative to the bare heated wires c, c, means 59 pivoted by a pivot pin 59' has been provided as shown in Fig. 4 to push the pieces T' longitudinally to abut against the annular stop flange 37 on the pulley 11 and thereby insure the proper alignment of the pieces T' transversely of the bare heated wires.

The means 59 preferably comprises a pivoted lever or pawl pivoted on the frame of the machine and actuated by a tension spring 60 urging the free end of the lever angularly and frictionally against the pulley 11 in the path of the pieces T' and the recesses or receivers 38.

The cooling pulley 22 is similar to pulley 11 in that it is provided with circumferential and transverse grooves or receivers. In view of the fact that the wires c, c engage firmly the major portion of the circumference of pulley 22, it is to be noted that pulley 22 produces the major drag or pull on the wires c, c in order to advance the work through the machine to its reception of the winding reel for the finished product.

The motors 20 and 30 are provided with switches and speed control means.

All of the driving means, gears, chains, belts, etc. are arranged and constructed to cooperate in synchronized relation so that the machine can operate successfully and smoothly.

It can now be readily understood that I have produced a machine requiring the use of low temperatures to form the union between the copper wires and the thermoplastic elements. The temperature of the wires at the exit of the oven 12 is approximately 600° F. and just before the wires physically contact the elements T', the temperature has fallen to approximately 300° F. This substantially continuous operation at substantially low temperatures is deemed to be a very desirable quality and spells continued success as well as mass production at a low cost.

This application is a refiled one plus additional information and is a substitute for application Ser. No. 244,906 by Faust R. Gonsett, now abandoned.

Having fully disclosed my said invention, what I claim is:

1. In a machine for the manufacture of a product comprising air insulated multiple conductor leads and thermoplastic spacing elements; indexing mechanism embodying combined guiding and feeding mechanism for thermoplastic elements; said indexing mechanism comprising a main pulley having thereon along one of its circumferential edges a continuous stop flange, said pulley also having on its circumference transversely arranged uniformly spaced receivers for the thermoplastic elements, said receivers comprising elongated shallow grooves terminating at one end at the stop flange, said pulley also having uniformly spaced circumferential grooves intersecting said receivers to receive wires in overlying and abutting relation to thermoplastic elements located in said receivers; means for feeding a multiple of conductor wires to the grooves on said pulley, heating means comprising an oven constituting a part of said machine for heating the advancing wires as they approach the pulley, means to maintain said wires under tension whereby said heated wires are forced and fused into thermoplastic elements on said pulley by pressure developed by the tension means, in combination with means for propelling the advance of the wires and thermoplastic elements thereon through the machine.

2. A machine for the manufacture of a product comprising multiple conductor leads, said machine comprising an indexing mechanism, a combined main propelling and cooling means, a combined guiding and main feeding means for thermoplastic spacing elements, a combined guiding and feeding means for a multiple of bare wires, a heating means for said wires, said indexing mechanism comprising a main pulley having on one edge of its circumference a continuous stop flange for the plastic elements, said main pulley also having on its circumference transversely arranged uniformly spaced receivers for the plastic elements, said receivers terminating at one end at the stop flange, said pulley also having uniformly spaced circumferential grooves intersecting said receivers to receive portions of the bare wires overlying said thermoplastic elements located in said receivers, said heating means comprising an oven constituting part of the machine for heating the advancing wires as they approach the indexing mechanism, means to maintain said wires under tension whereby said heated wires are forced and fused into the thermoplastic elements by pressure developed by the tension means, said combined propelling and cooling means comprising a second pulley having transversely arranged receivers on its circumference to receive the plastic elements secured to the wires, said second pulley being also provided with circumferential grooves receiving portions of the wires now carrying the plastic elements, said main and second pulleys being intergeared to synchronize their cooperation accurately, in combination with retaining means to maintain the thermoplastic elements on the main pulley in advance of the heated wire positioned adjacent the main pulley.

3. The combination set forth in claim 2 in combination with a final locating means for the plastic elements pivotally mounted on the machine in the path of the plastic elements to push said elements against the stop flange of the main pulley, said locating means being situated in advance of the physical contact between the heated wire and the plastic element.

4. The construction set forth in claim 2, in combination with a combined auxiliary supply chute and feed means for thermoplastic elements, said chute being supported radially in close proximity to the main pulley at the circumference thereof, said supply chute being adapted to contain thermoplastic elements urged forwardly by a suitable spring whereby failure of the main thermoplastic feed will be supplemented by the auxiliary supply chute and the feed means thereof.

5. The construction set forth in claim 2, in which said combined main propelling and cooling means comprises a second pulley supported adjacent said main pulley and substantially coplanar therewith to receive the multiple conductor lead with its thermoplastic elements thereon, said second pulley having receivers on its circumference arranged transversely thereof and suitably spaced to receive the thermoplastic elements on the lead, said main pulley and said second pulley being intergeared and propelled for synchronized cooperation to accommodate the reception of the thermoplastic elements, the major circumference of said second pulley being adapted to be engaged by said lead and its thermoplastic elements whereby said second pulley constitutes the main advancing means for said lead and its thermoplastic elements.

6. The construction set forth in claim 2, in which said main feeding means comprises guide means for a thermoplastic rod, said guide means being located at substantially a right angle to the main pulley and in the path of the stop flange of said main pulley but outside of the circumferential portion having the receivers for the thermoplastic elements, in combination with advancing means for said thermoplastic rod, said advancing means for said rod comprising a pair of grooved rollers, one of said grooved rollers being adapted to frictionally engage one side of the rod while the other grooved roller frictionally engages the opposite side of the rod whereby the rod may be arrested by stop means in its path.

7. The construction set forth in claim 2, in combination with a pivoted severing blade adapted to swing into and out of the path of a thermoplastic rod, said blade being pivoted at its inner end to a stationary support and its outer end is connected by a suitable tension spring to actuate said blade for severing a thermoplastic element from said rod, said blade having intermediate its ends a cam lobe depending therefrom, said main pulley having uniformly spaced studs projecting laterally from a side thereof and adjacent the circumference of said main pulley, said cam lobe being arranged in close proximity to said side of the main pulley and in the path of the studs thereon, whereby when one stud engages the cam lobe and elevates the blade against the tension of the spring to a releasing position an element will be severed from the rod and guided to a transverse receiver within the circumference of the main pulley.

8. The construction set forth in claim 2, in combination with a spring actuated pivoted pusher arm to push the thermoplastic elements longitudinally over against the circumferential stop flange of the main pulley, said pusher arm being mounted on the frame with its pusher contact in constant engagement with the main pulley outside of the path of the studs but in the path of the receivers having the thermoplastic elements therein, said arm being located in advance of but adjacent the position where the heated conductors initially engage the main pulley and the thermoplastic elements therein.

9. The combination set forth in claim 2, in further combination with a combined auxiliary supply chute and feeding means for the thermoplastic elements, said chute being secured on the machine in close proximity to the main pulley and extending radially therefrom, said auxiliary chute being above said heating means and sufficiently spaced therefrom so as not to be materially affected by the heat from the heating means, said retaining means comprising a pair of arcuate leaf springs, one of said springs being located above the exit of the auxiliary chute and the other being located below said exit whereby said auxiliary chute and feeding means may operate when necessary.

10. In a machine for the manufacture of multiple wire air insulated conductor leads, the subcombination comprising a combined guiding, feeding and severing mechanism for a thermoplastic rod, said mechanism comprising a main pulley having a continuous radial stop flange extending outwardly therefrom at one side thereof, said main pulley also having equally spaced and transversely arranged receivers in its circumference extending from said stop flange to the opposite side of the main pulley, said main pulley also having on opposite sides thereof two series of equally spaced laterally extending studs arranged adjacent but equally spaced radially and inwardly from the circumference thereof, said main pulley also having a pair of equally spaced circumferential grooves in the circumference thereof, said grooves intersecting said receivers whereby wires partly in said grooves can overlie thermoplastic elements in said receivers, said severing mechanism comprising a blade pivoted at one of its ends to an upright stationary portion of said machine and having its opposite end connected to a stationary portion of the machine by a tension spring, said blade having intermediate of its ends a depending cam lobe arranged in the path of one series of laterally extending studs whereby the blade may be elevated to a position above the advancing thermoplastic rod and when the cam lobe is released thereby providing for the actuation of the blade to sever the rod by the power of the tension spring, said guiding mechanism comprising a plurality of guides coaxially aligned with their axes located above the circumference of the main pulley but in alignment with the stop flange of the said pulley, said feeding mechanism for said thermoplastic rod comprising a pair of grooved rollers frictionally engaging said thermoplastic rod, whereby said rod may be advanced unless arrested by a stop means in its path, in combination with a stationary depending stop means located in the path of said thermoplastic rod and in close proximity with the inner side of the stop flange of said pulley, the thickness of said depending stop being substantially equal to the thickness of the blade thereby compensating and controlling the length of the thermoplastic element severed from the rod, in combination with a spring pressed positioning aid for the severed element of the rod, said aid comprising a transverse bar suitably guided and supported by portions of the machine, said transverse bar having a depending cam lobe located in close proximity to the stop flange but on the outside thereof in the path of the other series of studs, said transverse bar also having a depending block to assist in maintaining the severed thermoplastic element in alignment with an approaching receiver of the main pulley.

11. In a machine for the manufacture of multiple strand electrical conductor leads embodying a plurality of spaced wires united by a series of spacing elements, the combination of a revoluble pulley having a periphery formed with a series of uniformly spaced transverse grooves, means for successively delivering short lengths of plastic spacers to said grooves as the pulley revolves, means for releasably holding the spacers in the grooves while being advanced on said pulley, means for directing a multiple of spaced wires over a circumferential portion of said pulley in successive overlying abutting engagement with the spacers transversely thereof as the latter advance, means for pressing the wires against the spacers abutted thereby, and means for heating substantial lengths of said wires immediately previous to their engagement with said spacers whereby the heated wires are caused to sink into said spacers under heat and pressure.

12. The combination called for in claim 11 together with means engageable with the ends of the spacers on said pulley to align the ends of the spacers relative to the advancing wires.

13. The combination called for in claim 11 in which the spacer delivering means embodies means for feeding lengths of plastic rods transversely above said pulley in proximity thereto, and means timed and actuated by rotation of the pulley for severing the spacers from said rod preliminary to their delivery to said grooves.

14. The combination called for in claim 11 in which the spacer delivering means embodies means for feeding lengths of plastic rods transversely above said pulley in proximity thereto, and means timed and actuated by rotation of the pulley for severing the spacers from said rod preliminary to their delivery to said grooves, together with auxiliary means for automatically feeding spacers to certain empty grooves on said roller embodying a magazine for a number of spacers having a feed exit in the path of the grooves, and a spring pressed follower for ejecting the spacers from said magazine.

15. The combination called for in claim 11 in which the spacer delivering means embodies means for feeding lengths of plastic rods transversely above said pulley in proximity thereto, and means timed and actuated by rotation of the pulley for severing the spacers from said rod preliminary to their delivery to said grooves, and means for aligning the spacers with the groove about to receive it.

16. The combination called for in claim 11 together with means engageable with the united wires delivered from said pulley to effect advance thereof comprising a second pulley circumferentially aligned with said first named pulley having transverse grooves on its periphery to receive the spacers on the united wires on passing the wires circumferentially around said second pulley, and means for driving said pulleys at corresponding peripheral speeds.

References Cited in the file of this patent

UNITED STATES PATENTS

| | | |
|---|---|---|
| 1,793,487 | Johnson | Feb. 24, 1931 |
| 2,092,487 | Weston | Sept. 7, 1937 |
| 2,172,945 | Seeley | Sept. 12, 1939 |
| 2,242,022 | Blount | May 13, 1941 |
| 2,390,174 | Roemer | Dec. 4, 1945 |
| 2,544,503 | Kennedy | Mar. 6, 1951 |
| 2,585,484 | Menes | Feb. 12, 1952 |
| 2,787,567 | Fisher | Apr. 2, 1957 |

FOREIGN PATENTS

| | | |
|---|---|---|
| 631,914 | Great Britain | Nov. 11, 1949 |

OTHER REFERENCES

Modern Plastics, October 1951.